(12) United States Patent
Chang et al.

(10) Patent No.: US 10,065,372 B2
(45) Date of Patent: Sep. 4, 2018

(54) STEEL WIRE TRANSMISSION SYSTEM FOR THREE-DIMENSIONAL PRINTER AND ADJUSTING MECHANISM THEREOF

(71) Applicant: Teco Image Systems Co., Ltd., Taipei (TW)

(72) Inventors: Yu-Jen Chang, Taipei (TW); Ken-Te Chou, Taipei (TW); Ting-Chun Chen, Taipei (TW); Chien-Ying Chen, Taipei (TW)

(73) Assignee: TECO IMAGE SYSTEMS CO., LTD., Taipei (TW)

( * ) Notice: Subject to any disclaimer, the term of this patent is extended or adjusted under 35 U.S.C. 154(b) by 206 days.

(21) Appl. No.: 14/826,839

(22) Filed: Aug. 14, 2015

(65) Prior Publication Data
US 2016/0368216 A1 Dec. 22, 2016

(30) Foreign Application Priority Data
Jun. 18, 2015 (TW) .............................. 104119710 A

(51) Int. Cl.
*B29C 64/236* (2017.01)
*F16G 9/00* (2006.01)
(Continued)

(52) U.S. Cl.
CPC .......... *B29C 67/0085* (2013.01); *B29C 64/20* (2017.08); *F16G 11/00* (2013.01);
(Continued)

(58) Field of Classification Search
CPC ............................. B29C 67/0085; B33Y 30/00
(Continued)

(56) References Cited

U.S. PATENT DOCUMENTS 86,119 A * 1/1869 Allport .................. F16G 11/00
24/129 R
636,138 A * 10/1899 Hatfield .................... F16G 1/28
24/31 C
(Continued)

FOREIGN PATENT DOCUMENTS

CN 1456865 A 11/2003
CN 1995777 A 7/2007
(Continued)

OTHER PUBLICATIONS

Capstan. Published Aug. 24, 2013. https://web.archive.org/web/20130824033639/http://etc.usf.edu/clipart/20000/20058/capstan_20058.htm.*
(Continued)

*Primary Examiner* — Jacob T Minskey
*Assistant Examiner* — Russell E Sparks
(74) *Attorney, Agent, or Firm* — Kirton McConkie; Evan R. Witt

(57) ABSTRACT

A steel wire transmission system includes plural slide rail seats, plural slide rails, plural wheel sets corresponding to the plural slide rails, plural slide blocks, plural steel wires, plural guide rods and a printhead module. The plural slide rails are disposed on the corresponding slide rail seats. Each wheel set includes a driving wheel and a driven wheel corresponding to the driving wheel. The driving wheel and the driven wheel of each wheel set are fixed at two ends of the corresponding slide rail. Each slide block is sheathed around the corresponding slide rail and movable between the corresponding driving wheel and the corresponding driven wheel. The plural steel wires are wound around the corresponding wheel sets. Each guide rod is connected with two corresponding slide blocks. The printhead module is connected with the plural guide rods.

6 Claims, 9 Drawing Sheets

(51) Int. Cl.
*F16G 11/08* (2006.01)
*B33Y 30/00* (2015.01)
*F16G 11/12* (2006.01)
*F16H 19/06* (2006.01)
*B29C 67/00* (2017.01)
*F16G 11/00* (2006.01)
*B29C 64/20* (2017.01)

(52) U.S. Cl.
CPC ............. *F16G 11/12* (2013.01); *F16H 19/06* (2013.01); *F16H 19/0672* (2013.01); *B33Y 30/00* (2014.12); *F16G 9/00* (2013.01); *F16G 11/08* (2013.01); *F16H 2019/0686* (2013.01)

(58) Field of Classification Search
USPC ......................................................... 425/375
See application file for complete search history.

(56) References Cited

U.S. PATENT DOCUMENTS

| | | | | |
|---|---|---|---|---|
| 896,053 | A * | 8/1908 | Bouchard et al. | B65G 21/2072 279/97 |
| 1,769,245 | A * | 7/1930 | Tregoning | F16G 13/00 16/442 |
| 2,054,468 | A * | 9/1936 | Pothier | B60R 13/105 40/203 |
| 2,251,031 | A * | 7/1941 | Bozeman, Jr. | D01H 5/74 403/26 |
| 3,461,733 | A * | 8/1969 | Peterson | F16G 3/00 24/31 C |
| 5,230,665 | A * | 7/1993 | Tanaka | B64G 9/00 474/153 |
| 5,411,445 | A * | 5/1995 | Oda | B21L 11/12 474/154 |
| 5,698,959 | A * | 12/1997 | Yanagisawa | B25J 5/04 318/568.11 |
| 2013/0091801 | A1 | 4/2013 | McCollum | |
| 2016/0193709 | A1 * | 7/2016 | Johnson | B23Q 37/005 29/560 |
| 2016/0236409 | A1 * | 8/2016 | Armani | B29C 67/0092 |

FOREIGN PATENT DOCUMENTS

| | | |
|---|---|---|
| CN | 102452076 A | 5/2012 |
| CN | 202468874 U | 10/2012 |
| CN | 103065542 | 4/2013 |
| CN | 203031962 U | 7/2013 |
| CN | 203836100 U | 9/2014 |
| CN | 104647762 | 5/2015 |

OTHER PUBLICATIONS

14-Gauge x 100 ft. Galvanized Steel Wire. Home Depot. Published Nov. 14, 2014. http://www.homedepot.com/p/OOK-14-Gauge-x-100-ft-Galvanized-Steel-Wire-50142/100200924.*

Chapter 4. Rotation and Conservation of Angular Momentum. Western University Department of Physics and Astronomy. http://www.astro.uwo.ca/~houde/courses/PDF%20files/physics1501/Ch4-Angular_Momentum_Conservation.pdf.*

* cited by examiner

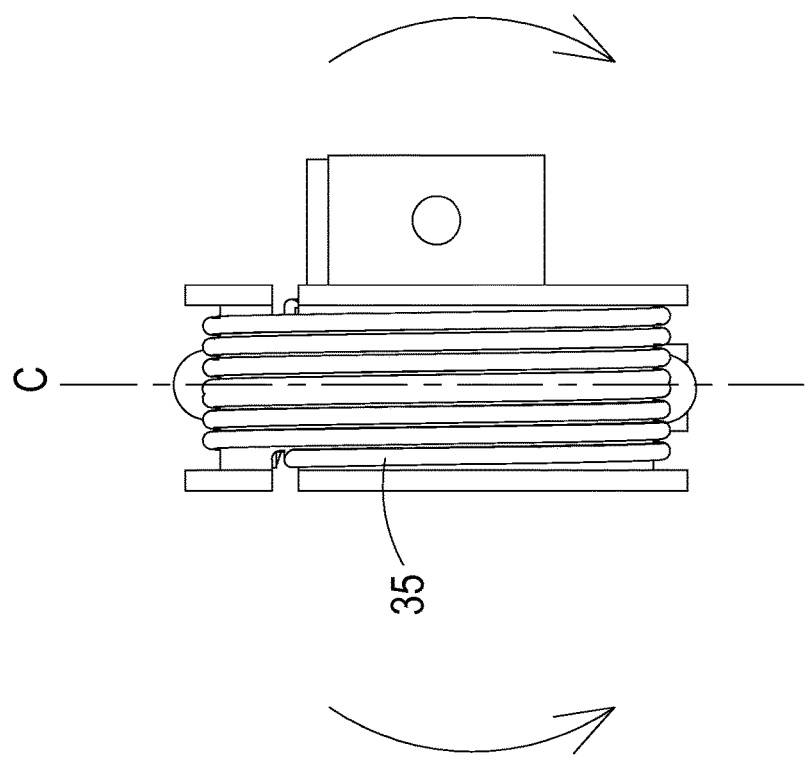

STEEL WIRE TRANSMISSION SYSTEM FOR THREE-DIMENSIONAL PRINTER AND ADJUSTING MECHANISM THEREOF

FIELD OF THE INVENTION

The present invention relates to a transmission system for a three-dimensional printer, and more particularly to a steel wire transmission system for a three-dimensional printer and an adjusting mechanism of the steel wire transmission system.

BACKGROUND OF THE INVENTION

In recent years, three-dimensional printing technologies, also referred as additive manufacturing (AM) technologies are rapidly developed and become increasingly popular. As known, there are various AM technologies. In accordance with the operating principle of the AM technology, a three-axis transmission system or a single-axis transmission system and nozzles cooperate to extrude a plastic material or other build material in order to produce a three-dimensional object. The overall quality of the three-dimensional object is dependent on nozzle control and size precision. The size precision is influenced by the transmission precision of the three-axis transmission system or the single-axis transmission system.

Nowadays, a fused deposition modeling (FDM) technology is an additive manufacturing technology commonly used for modeling, prototyping, and production applications. In the FDM technology, the build material is usually supplied in a filament form through a transmission system. That is, the time period of forming the three-dimensional object by the FDM technology is longer than other AM technologies. Therefore, it is an important issue to increase the precision and speed of the FDM technology. For increasing the printing speed and the printing precision, the stability and the positioning precision of the transmission system become more important.

For most three-dimensional printers, the belt transmission systems and the screw transmission systems are the mainstreams. FIG. 1 schematically illustrates a belt transmission system for a three-dimensional printer according to the prior art. As shown in FIG. 1, the belt transmission system 1 comprises a driving pulley 11, a driven pulley 12 and a transmission belt 10. During transmission, the tooth structures of the transmission belt 10 are repeatedly engaged with and disengaged from the tooth structures of the driving pulley 11 and the driven pulley 12. Once the tooth structure of the transmission belt 10 is engaged with and disengaged from the tooth structure of the driving pulley 11 or the driven pulley 12, the friction between the corresponding tooth structures and the assembling tolerance of the corresponding tooth structures may result in a backlash problem. Moreover, upon rotations of the driving pulley 11 and the driven pulley 12, the normal forces applied to the tooth structures may generate friction forces. Consequently, the long-term rotations of the driving pulley 11 and the driven pulley 12 may abrade the tooth structures of the transmission belt 10. Under this circumstance, the positioning precision is deteriorated. That is, even if the fabricating cost of the belt transmission system 1 is low, the backlash problem resulted from the belt transmission and the belt abrasion problem resulted from the long-term rotation may adversely affect the positioning precision.

FIG. 2 schematically illustrates a screw transmission system for a three-dimensional printer according to the prior art. During transmission of the screw transmission system 2, the rolling motions of plural small beads 21 allow a slide block 22 to be moved along a screw 23 in a reciprocating manner. Since the small beads 21 are precisely fabricated, the backlash of the screw transmission system 2 is lower than the belt transmission system. Moreover, since the transmission is performed by the rolling contact, the abrasion problem resulted from the long-term transmission is largely reduced. Although the screw transmission system can solve the problems of the belt transmission system, there are still some drawbacks. For example, since the screw transmission system is expensive, the fabricating cost of the three-dimensional printer is high.

Therefore, there is a need of provides a steel wire transmission system for a three-dimensional printer in order to overcome the above drawbacks.

SUMMARY OF THE INVENTION

An object of the present invention provides a steel wire transmission system for a three-dimensional printer and an adjusting mechanism of the steel wire transmission system. Since the adjusted tension of a steel wire is used to move a slide block, the steel wire transmission system of the present invention has the benefits of the conventional screw transmission system (e.g., small backlash and low abrasion). Moreover, the steel wire transmission system of the present invention is more cost-effective than the conventional belt transmission system. In other words, the steel wire transmission system of the present invention has the benefits of the conventional transmission systems and is able to solve the drawbacks of the conventional transmission systems.

Another object of the present invention provides a steel wire transmission system for a three-dimensional printer and an adjusting mechanism of the steel wire transmission system. Since the rigidity of the steel wire is very strong and the transmission between the steel wire and the driving wheel is frictionless, the positioning precision of the transmission system can be maintained after the long-term transmission. Moreover, since the cost of the steel wire is low and the steel wire is easily assembled, the assembling complexity and the fabricating cost are largely reduced.

A further object of the present invention provides a steel wire transmission system for a three-dimensional printer and an adjusting mechanism of the steel wire transmission system. The use of the adjusting mechanism can increase the reliability of adjusting the steel wire.

In accordance with an aspect of the present invention, there is provided a steel wire transmission system for a three-dimensional printer. The steel wire transmission system includes plural slide rail seats, plural slide rails, plural wheel sets corresponding to the plural slide rails, plural slide blocks, plural steel wires, plural guide rods and a printhead module. The plural slide rails are disposed on the corresponding slide rail seats so as to implement multi-axis transmission. Each wheel set includes a driving wheel and a driven wheel corresponding to the driving wheel. The driving wheel and the driven wheel of each wheel set are fixed at two ends of the corresponding slide rail. Each slide block is sheathed around the corresponding slide rail and movable between the corresponding driving wheel and the corresponding driven wheel. The plural steel wires are wound around the corresponding wheel sets and penetrated through the corresponding slide blocks. Each guide rod is connected with two corresponding slide blocks. The printhead module is connected with the plural guide rods. When at least one of the plural slide rails is rotated in response to a driving force, the corresponding driving wheel is rotated with the slide rail and the corresponding steel wire is moved. As the corresponding slide block is moved with the steel wire, the corresponding guide rod is moved and the printhead module is moved to a desired position in response to the driving force.

In accordance with another aspect of the present invention, there is provided a steel wire transmission system for a three-dimensional printer. The steel wire transmission system includes n slide rail seats, n slide rails, n wheel sets corresponding to the n slide rails, n slide blocks, n steel wires, m guide rods and a printhead module. The n slide rails are disposed on the corresponding slide rail seats so as to implement multi-axis transmission. Each wheel set includes a driving wheel and a driven wheel corresponding to the driving wheel. The driving wheel and the driven wheel of each wheel set are fixed at two ends of the corresponding slide rail. Each slide block is sheathed around the corresponding slide rail and movable between the corresponding driving wheel and the corresponding driven wheel. The n steel wires are wound around the corresponding wheel sets and penetrated through the corresponding slide blocks. Each guide rod is connected with two corresponding slide blocks. The printhead module is connected with the m guide rods, wherein n=2m, and m is a positive integer. When at least one of the plural slide rails is rotated in response to a driving force, the corresponding driving wheel is rotated with the slide rail and the corresponding steel wire is moved. As the corresponding slide block is moved with the steel wire, the corresponding guide rod is moved and the printhead module is moved to a desired position in response to the driving force.

In accordance with a further aspect of the present invention, there is provided an adjusting mechanism of a steel wire transmission system for a three-dimensional printer. The steel wire transmission system includes a steel wire. A head portion of the steel wire includes a first movable ball and a first fixed ball. A tail portion of the steel wire includes a second movable ball and a second fixed ball. The adjusting mechanism includes an adjusting element, a first sleeve and a second sleeve. The adjusting element includes an operating part, a first coupling part and a second coupling part. The first coupling part is located at a first side of the adjusting element, and an outer surface of the first coupling part has a right-spirally outer threaded structure. The second coupling part is located at a second side of the adjusting element, and an outer surface of the second coupling part has a left-spirally outer threaded structure. The first sleeve is located beside the first side of the adjusting element, and includes a first opening and a first accommodation space. An inner surface of the first sleeve has a right-spirally inner threaded structure. The right-spirally inner threaded structure of the first sleeve and the right-spirally outer threaded structure of the first coupling part are engaged with each other. The second sleeve is located beside the second side of the adjusting element, and includes a second opening and a second accommodation space. An inner surface of the second sleeve has a left-spirally inner threaded structure. The left-spirally inner threaded structure of the second sleeve and the left-spirally outer threaded structure of the second coupling part are engaged with each other. The first movable ball and the first fixed ball are sequentially introduced into the first accommodation space through the first opening. The second movable ball and the second fixed ball are sequentially introduced into the second accommodation space through the second opening, so that the steel wire is in a loop form.

The above contents of the present invention will become more readily apparent to those ordinarily skilled in the art after reviewing the following detailed description and accompanying drawings, in which:

BRIEF DESCRIPTION OF THE DRAWINGS

FIG. 5 schematically illustrates the relationship between the driving wheel and the steel wire of the steel wire transmission system according to the embodiment of the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
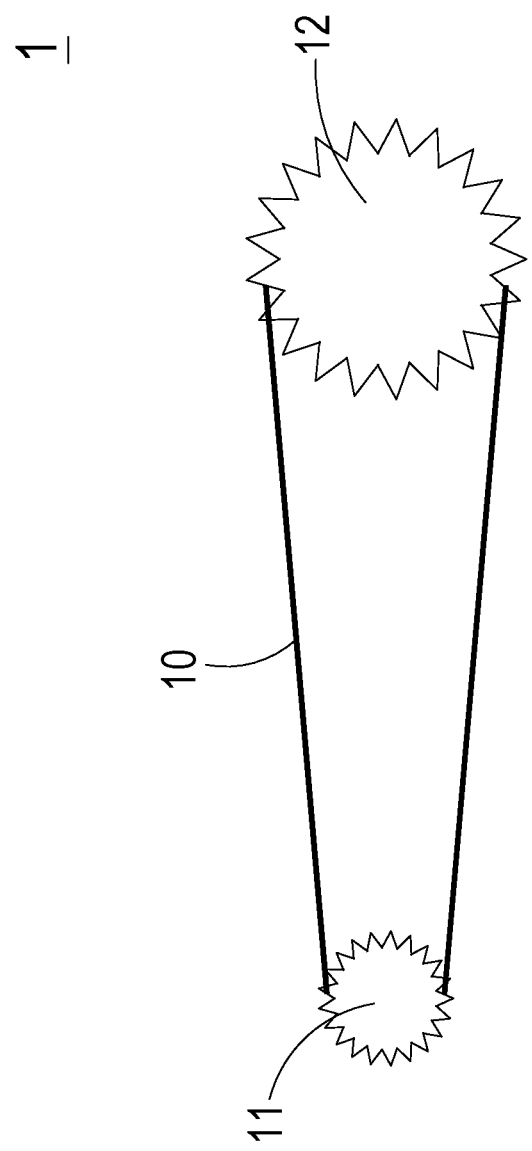
FIG. 1 schematically illustrates a belt transmission system for a three-dimensional printer according to the prior art.
Figure 2:
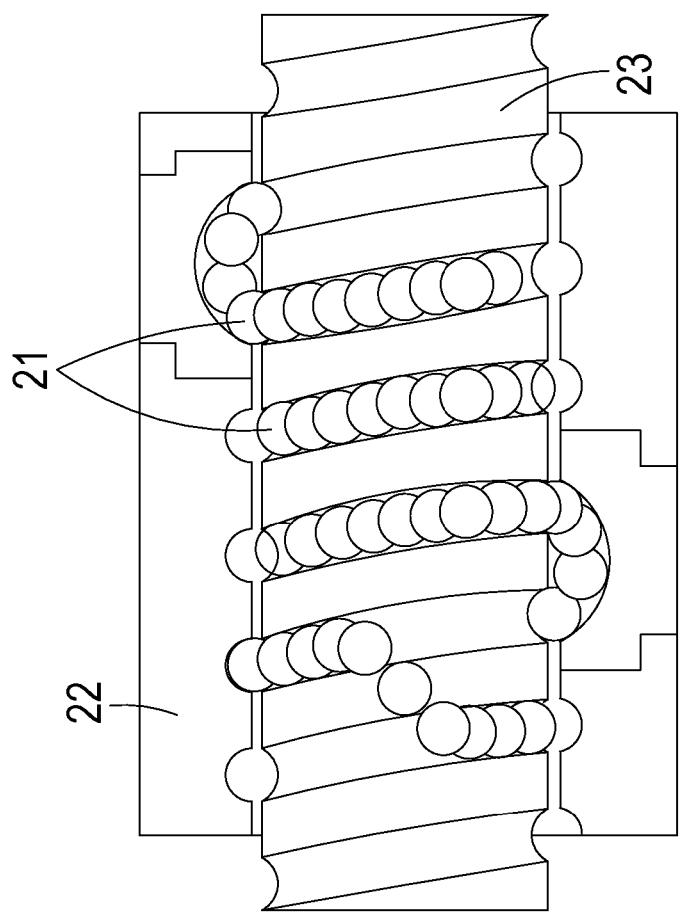
FIG. 2 schematically illustrates a screw transmission system for a three-dimensional printer according to the prior art.
Figure 3:
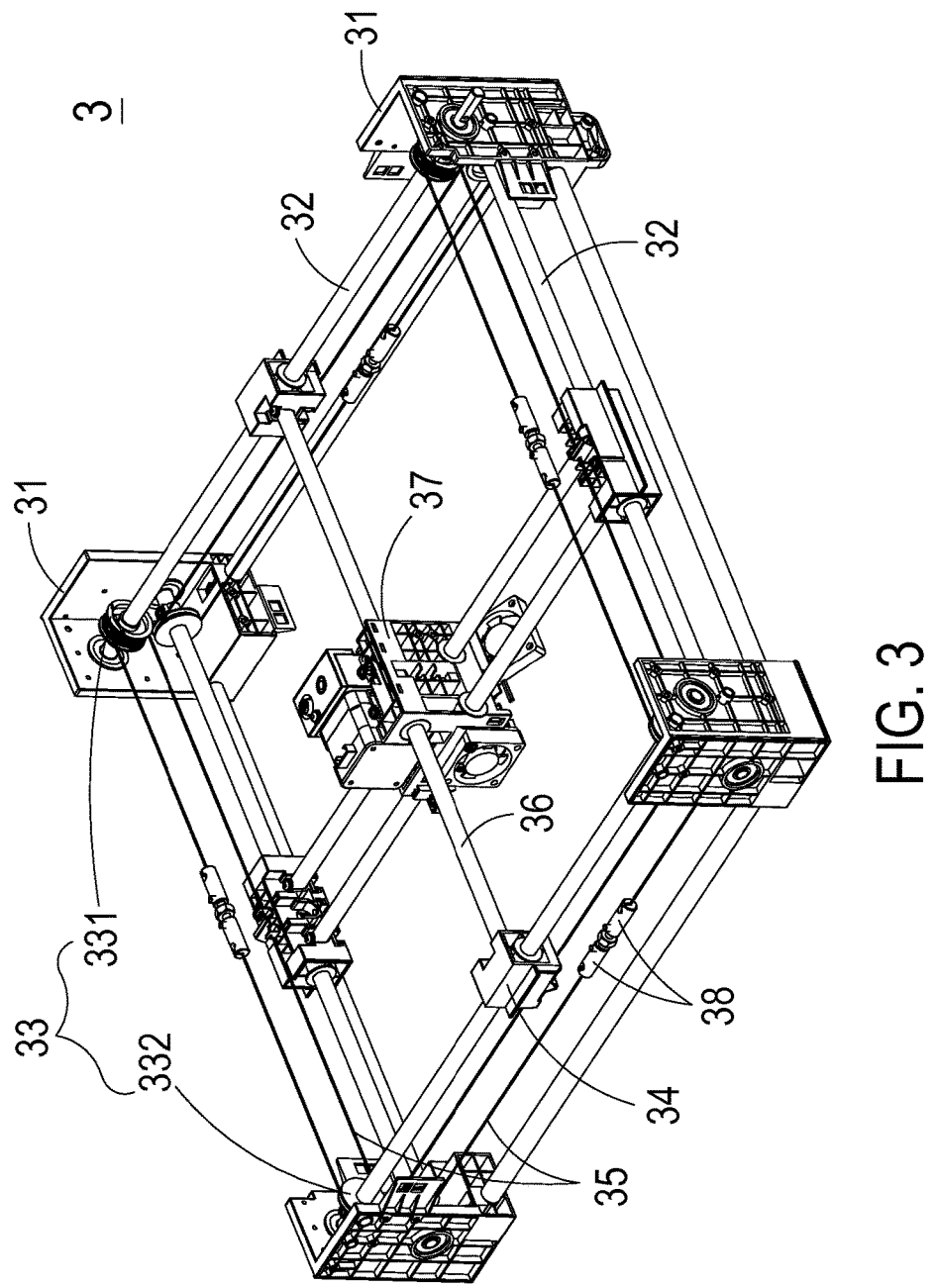
FIG. 3 schematically illustrates a steel wire transmission system for a three-dimensional printer according to an embodiment of the present invention.

FIG. 3 schematically illustrates a steel wire transmission system for a three-dimensional printer according to an embodiment of the present invention. As shown in FIG. 3, the steel wire transmission system 3 comprises plural slide rail seats 31, plural slide rails 32, plural wheel sets 33, plural slide blocks 34, plural steel wires 35, plural guide rods 36 and a printhead module 37. The plural slide rails 32 are disposed on the corresponding slide rail seats 31 in order to implement the multi-axis transmission. Each wheel set 33 comprises a driving wheel 331 and a driven wheel 332 corresponding to the driving wheel 331. Each wheel set 33 corresponds to one of the plural slide rails 32. The driving wheel 331 and the driven wheel 332 of each wheel set 33 are fixed at two ends of the corresponding slide rail 32. Each slide block 34 is sheathed around the corresponding slide rail 32 and movable between the positions of the corresponding driving wheel 331 and the corresponding driven wheel 332. Each steel wire 35 is wound around the corresponding wheel set 33 and penetrated through the corresponding slide block 34. Each guide rod 36 is connected with two corresponding slide blocks 34. The printhead module 37 is connected with the plural guide rods 36. When at least one slide rail 32 is rotated in response to a driving force, the corresponding driving wheel 331 is rotated with the slide rail 32 and the corresponding steel wire 35 is moved. As the corresponding slide block 34 is moved with the steel wire 35, the corresponding guide rod 36 is moved. Consequently, the printhead module 37 is moved to a desired position in response to the driving force.

In accordance with the present invention, the steel wire 35 is in a loop form. Moreover, while the steel wire 35 is rotated forwardly or backwardly, the steel wire 35 has a tension for achieving the reciprocating motion. Consequently, the steel wire 35 has to be positioned at and wound around the driving wheel 331. The turn number of the steel wire 35 around the driving wheel 331 is determined according to the movable distance of the steel wire 35.

Figure 4:
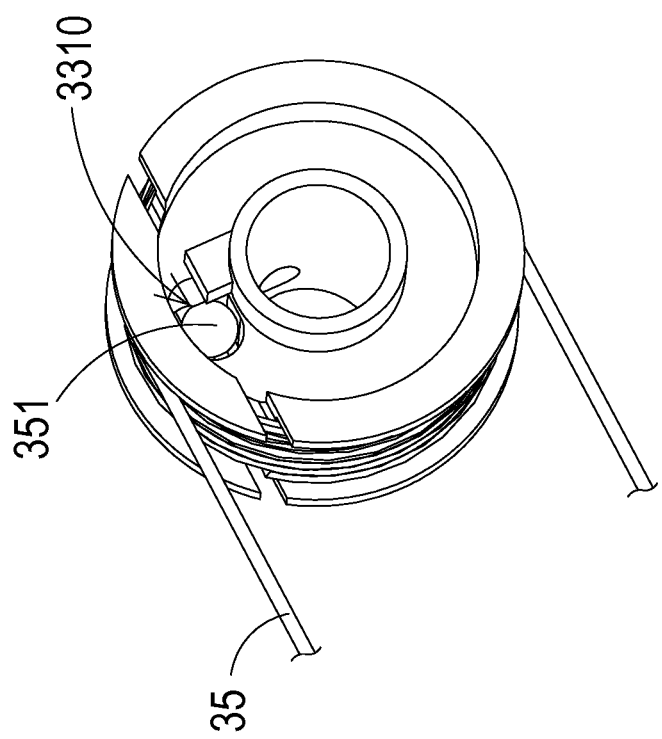
FIG. 4 schematically illustrates the driving wheel of the wheel set of the steel wire transmission system according to the embodiment of the present invention.

FIG. 4 schematically illustrates the driving wheel of the wheel set of the steel wire transmission system according to the embodiment of the present invention. FIG. 5 schematically illustrates the relationship between the driving wheel and the steel wire of the steel wire transmission system according to the embodiment of the present invention. Please refer to FIGS. 3, 4 and 5. The driving wheel 331 has a perforation 3310. Each steel wire 35 has a first positioning ball 351. The first positioning ball 351 is formed on the steel wire 35 and accommodated within the perforation 3310 of the driving wheel 331.

In an embodiment, a first portion of the steel wire 35 at a first side of the first positioning ball 351 is wound around a first side of the driving wheel 331 in a clockwise direction with respect to a center line C of the driving wheel 331, and a second portion of the steel wire 35 at a second side of the first positioning ball 351 is wound around a second side of the driving wheel 331 in a counterclockwise direction with respect to the center line C of the driving wheel 331.

Figure 6A:
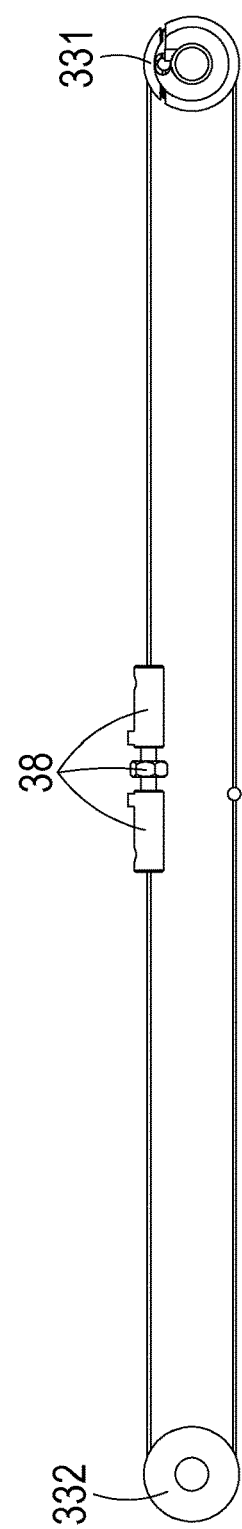
FIG. 6A schematically illustrates the relationship between an adjusting mechanism and the corresponding wheel set of the steel wire transmission system according to the embodiment of the present invention.
Figure 6B:
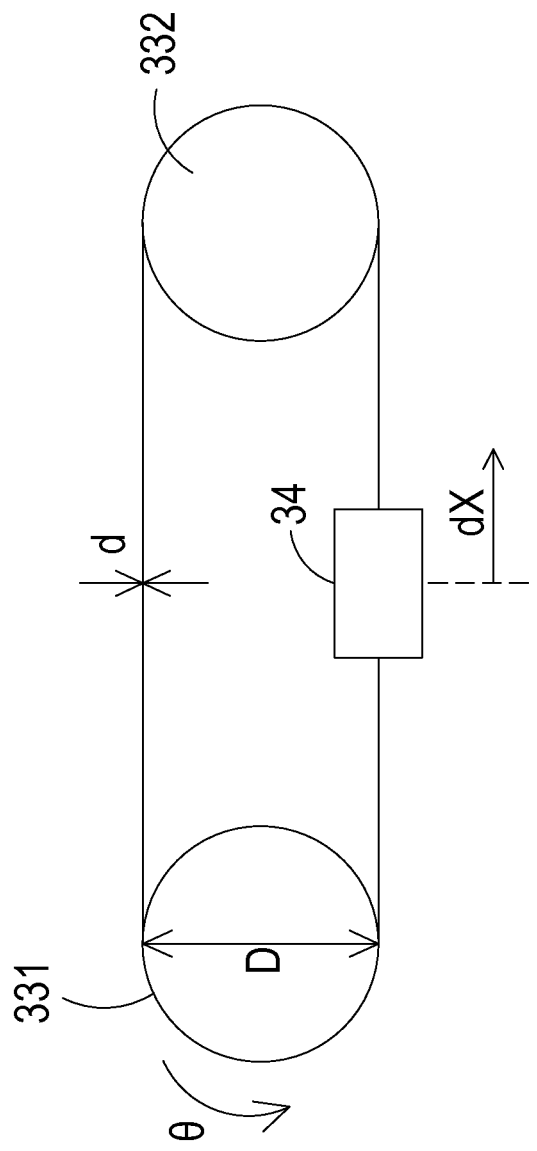
FIG. 6B schematically illustrates the relationship between the slide block and the corresponding wheel set of the steel wire transmission system according to the embodiment of the present invention.
Figure 6C:
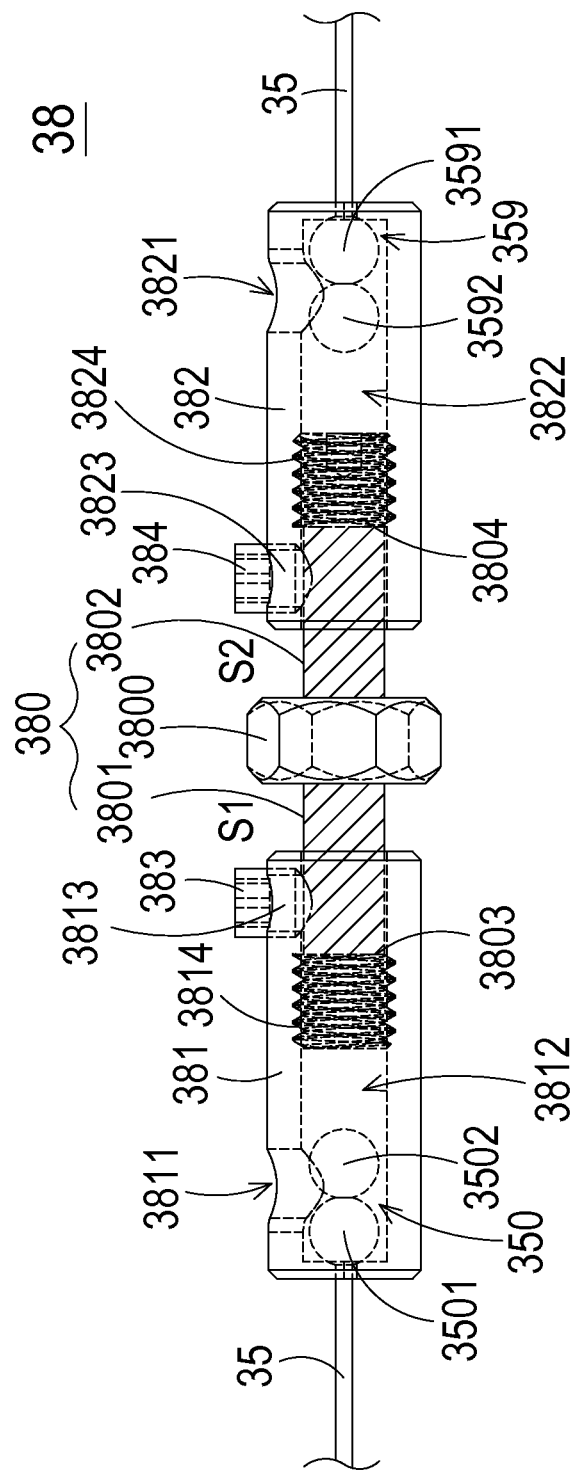
FIG. 6C schematically illustrates the adjusting mechanism of the steel wire transmission system according to the embodiment of the present invention.

The steel wire transmission system 3 further comprises plural adjusting mechanisms. FIG. 6A schematically illustrates the relationship between an adjusting mechanism and the corresponding wheel set of the steel wire transmission system according to the embodiment of the present invention. FIG. 6B schematically illustrates the relationship between the slide block and the corresponding wheel set of the steel wire transmission system according to the embodiment of the present invention. FIG. 6C schematically illustrates the adjusting mechanism of the steel wire transmission system according to the embodiment of the present invention. Please refer to FIGS. 3, 6A, 6B and 6C. Each adjusting mechanism 38 is connected with a corresponding steel wire 35 and in parallel with the corresponding slide rail 32. Moreover, a head portion 350 and a tail portion 359 of the steel wire 35 are disposed within the adjusting mechanism 38, so that the steel wire 35 is in a loop form.

When the slide rail 32 is rotated in response to the driving force, the displacement dX of the slide block 34 may be expressed as the following formula: $dX = \theta \times (D+d)/2$, wherein $\theta$ is the rotation angle of the driving wheel 331, D is the outer diameter of the driving wheel 331, and d is the diameter of the steel wire 35.

The structure of the adjusting mechanism 38 will be illustrated in more details as follows. The adjusting mechanism 38 comprises an adjusting element 380, a first sleeve 381 and a second sleeve 382. The adjusting element 380 comprises an operating part 3800, a first coupling part 3801 and a second coupling part 3802. The operating part 3800 is located at a middle region of the adjusting element 380. The first coupling part 3801 is located at a first side S1 of the adjusting element 380, and an outer surface of the first coupling part 3801 has a right-spirally outer threaded structure 8303. The second coupling part 3802 is located at a second side S2 of the adjusting element 380, and an outer surface of the second coupling part 3802 has a left-spirally outer threaded structure 8304. The first sleeve 381 is located beside the first side S1 of the adjusting element 380. The first sleeve 381 comprises a first opening 3811 and a first accommodation space 3812. In addition, an inner surface of the first sleeve 381 has a right-spirally inner threaded structure 3814. The right-spirally inner threaded structure 3814 of the first sleeve 381 and the right-spirally outer threaded structure 8303 of the first coupling part 3801 are engaged with each other. The second sleeve 382 is located beside the second side S2 of the adjusting element 380. The second sleeve 382 comprises a second opening 3821 and a second accommodation space 3822. In addition, an inner surface of the second sleeve 382 has a left-spirally inner threaded structure 3824. The left-spirally inner threaded structure 3824 of the second sleeve 382 and the left-spirally outer threaded structure 3804 of the second coupling part 3802 are engaged with each other. Consequently, the first coupling part 3801 and the second coupling part 3802 of the adjusting element 380 are coupled with the first sleeve 381 and the second sleeve 382, respectively. By rotating the operating part 3800 of the adjusting element 380, the tightness of the steel wire 35 can be adjusted. If the tightness of the steel wire 35 is increased, the tension of the steel wire 35 is increased. Whereas, if the tightness of the steel wire 35 is decreased, the tension of the steel wire 35 is decreased. If the tension of the steel wire 35 is much larger than the force for moving the slide block 34, the friction of the slide block 34 is negligible. Consequently, the tension of the steel wire 35 upon the forward rotation of the driving wheel 331 and the tension of the steel wire 35 upon the backward rotation of the driving wheel 331 are identical.

Moreover, the head portion 350 of the steel wire 35 comprises a first movable ball 3501 and a first fixed ball 3502, and the tail portion 359 of the steel wire 35 comprises a second movable ball 3591 and a second fixed ball 3592. The first movable ball 3501 and the first fixed ball 3502 are sequentially introduced into the first accommodation space 3812 through the first opening 3811. The second movable ball 3591 and the second fixed ball 3592 are sequentially introduced into the second accommodation space 3822 through the second opening 3821. Generally, the steel wire 35 is woven forwardly or backwardly, so that the rigidity of the steel wire 35 is increased. While the steel wire 35 is connected with the adjusting mechanism 38 to be in the loop form, the length of the steel wire 35 is possibly changed because the steel wire 35 is twisted. For avoiding the length change of the steel wire 35, the free rotation of the first movable ball 3501 and the second movable ball 3591 can release the stress that is generated from the twisted steel wire 35 during the connecting process. Consequently, the length of the steel wire 35 is kept unchanged. Moreover, the first fixed ball 3502 and the second fixed ball 3592 can prevent the detachment of the first movable ball 3501 and the second movable ball 3591 from the steel wire 35.

Moreover, the first sleeve 381 further comprises a first fixing part 3813, and the second sleeve 382 further comprises a second fixing part 3823. The adjusting mechanism 38 further comprises a first stopping structure 383 and a second stopping structure 384. The first stopping structure 383 and the second stopping structure 384 are engaged with the first fixing part 3813 and the second fixing part 3823, respectively. The first stopping structure 383 and the second stopping structure 384 are used for stopping the operating part 3800 of the adjusting element 380 in order to prevent detachment of the adjusting element 380. As mentioned above, the adjusting element 380 is used for adjusting the tension of the steel wire 35. During the printing process, it is necessary to repeatedly move the slide block 34. That is, the direction of the tension of the steel wire 35 is repeatedly changed. Under this circumstance, the adjusting mechanism 38 is readily loosened. Since the first stopping structure 383 and the second stopping structure 384 are respectively engaged with the first fixing part 3813 and the second fixing part 3823, the adjusting element 380 will not be detached.

Figure 7:
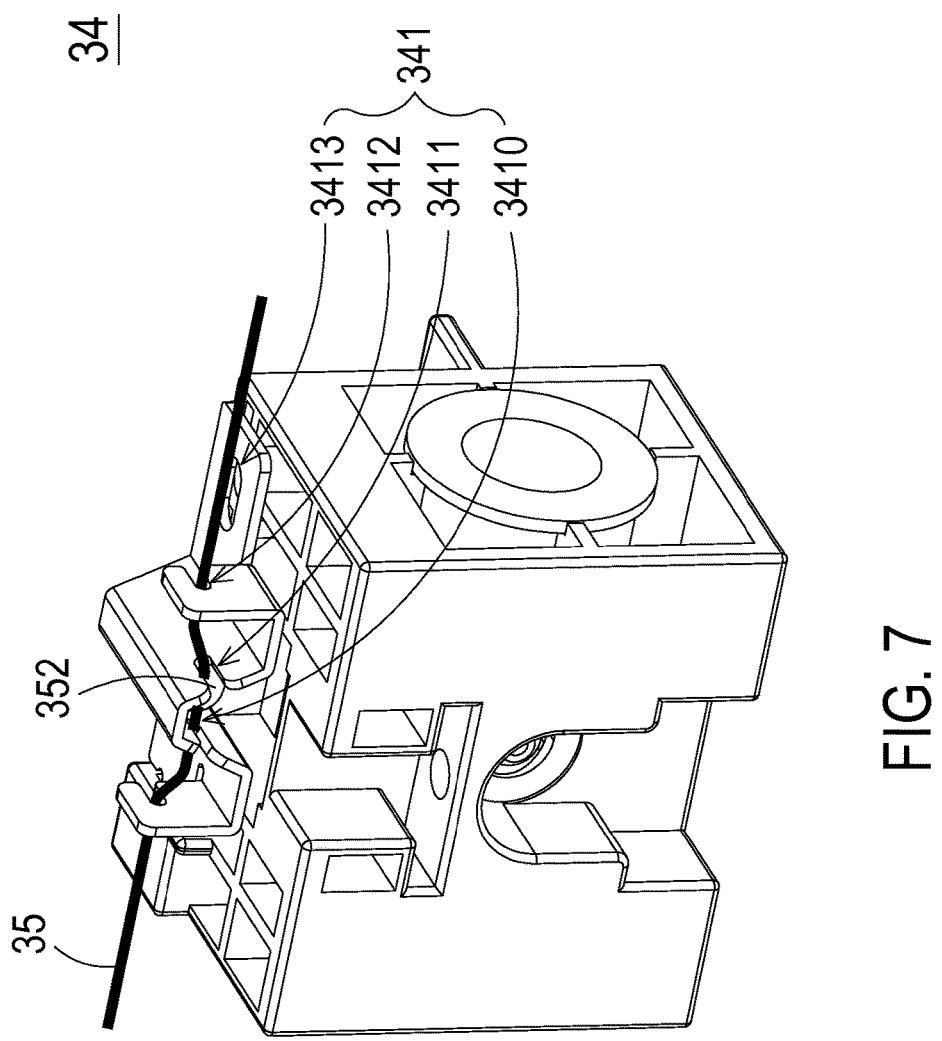
FIG. 7 schematically illustrates the relationship between the slide block and the corresponding steel wire of the steel wire transmission system according to the embodiment of the present invention.

FIG. 7 schematically illustrates the relationship between the slide block and the corresponding steel wire of the steel wire transmission system according to the embodiment of the present invention. Please refer to FIGS. 3 and 7. Each slide block 34 has a clamping part 341. The clamping part 341 comprises a receiving structure 3410, two first hooking structures 3411 and two second hooking structures 3412. The first hooking structures 3411 are located at two opposite sides of the receiving structure 3410, and the second hooking structures 3412 are located at two opposite sides of the receiving structure 3410. However, the first hooking structures 3411 and the second hooking structures 3412 are open to opposite directions. Moreover, the steel wire 35 further comprises a second positioning ball 352. The second positioning ball 352 is formed on the steel wire 35 and accommodated within the receiving structure 3410 of the clamping part 341 of the slide block 34. Moreover, the steel wire 35 is penetrated through the two first hooking structures 3411 and the two second hooking structures 3412.

Moreover, the clamping part 341 of the slide block 34 further comprises an elongated slot 3413. After a fastening element (e.g., a screw) is penetrated through the elongated slot 3413 of the clamping part 341 and tightened into the slide block 34, the clamping part 341 is fixed on the slide block 34. Preferably, the elongated slot 3413 is formed in an extension structure that is extended from the receiving structure 3410. Consequently, the fixed position of the clamping part 341 is adjustable according to the assembling tolerance.

An example of the steel wire transmission system for implementing the multi-axis transmission comprises n slide rail seats 31, n slide rails 32, n wheel sets 33, n slide blocks 34, n steel wires 35, m guide rods 36 and a printhead module 37, wherein n=2m, and m is a positive integer. The n slide rails 32 are disposed on the corresponding slide rail seats 31 in order to implement the multi-axis transmission. Each wheel set 33 comprises a driving wheel 331 and a driven wheel 332 corresponding to the driving wheel 331. Each wheel set 33 corresponds to one of the n slide rails 32. The driving wheel 331 and the driven wheel 332 of each wheel set 33 are fixed at two ends of the corresponding slide rail 32. Each slide block 34 is sheathed around the corresponding slide rail 32 and movable between the positions of the corresponding driving wheel 331 and the corresponding driven wheel 332. Each steel wire 35 is wound around the corresponding wheel set 33 and penetrated through the corresponding slide block 34. Each guide rod 36 is connected with two corresponding slide blocks 34. The printhead module 37 is connected with the m guide rods 36. When at least one slide rail 32 is rotated in response to a driving force, the corresponding driving wheel 331 is rotated with the slide rail 32 and the corresponding steel wire 35 is moved. As the corresponding slide block 34 is moved with the steel wire 35, the corresponding guide rod 36 is moved. Consequently, the printhead module 37 is moved to a desired position in response to the driving force.

From the above descriptions, the present invention provides a steel wire transmission system for a three-dimensional printer and an adjusting mechanism of the steel wire transmission system. Since the adjusted tension of the steel wire is used to move the slide block, the steel wire transmission system of the present invention has the benefits of the conventional screw transmission system (e.g., small backlash and low abrasion). Moreover, the steel wire transmission system of the present invention is more cost-effective than the conventional belt transmission system. In other words, the steel wire transmission system of the present invention has the benefits of the conventional transmission systems and is able to solve the drawbacks of the conventional transmission systems. Moreover, since the rigidity of the steel wire is very strong and the transmission between the steel wire and the driving wheel is frictionless, the positioning precision of the transmission system can be maintained after the long-term transmission. Moreover, since the cost of the steel wire is low and the steel wire is easily assembled, the assembling complexity and the fabricating cost are largely reduced. Moreover, the use of the adjusting mechanism can increase the reliability of adjusting the steel wire.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A steel wire transmission system for a three-dimensional printer, the steel wire transmission system comprising:

plural slide rail seats;

plural slide rails disposed on corresponding slide rail seats so as to implement multi-axis transmission;

plural wheel sets corresponding to the plural slide rails, wherein each wheel set comprises a driving wheel and a driven wheel corresponding to the driving wheel, wherein the driving wheel and the driven wheel of each wheel set are fixed at two ends of a corresponding slide rail;

plural slide blocks, wherein each slide block is sheathed around the corresponding slide rail and movable between a corresponding driving wheel and a corresponding driven wheel, wherein each slide block has a clamping part, wherein the clamping part comprises a receiving structure, two first hooking structures and two second hooking structures, wherein the first hooking structures are located at two opposite sides of the receiving structure, and the second hooking structures are located at the two opposites sides of the receiving structure, wherein the two first hooking structures and the two second hooking structures are open to opposite directions;

plural steel wires wound around the plural wheel sets and penetrated through corresponding slide blocks, wherein the driving wheel has a perforation, and a corresponding steel wire has a first positioning ball, wherein the first positioning ball is formed on the steel wire and accommodated within the perforation of the driving wheel, wherein each steel wire further comprises a second positioning ball, wherein the second positioning ball is formed on the steel wire and accommodated within the receiving structure of the clamping part of the slide block, wherein the steel wire is penetrated through the two first hooking structures and the two second hooking structures;

plural adjusting mechanisms corresponding to the plural steel wires, wherein each adjusting mechanism is connected with a corresponding steel wire and in parallel with the corresponding slide rail, wherein a head portion and a tail portion of each steel wire are disposed within a corresponding adjusting mechanism, so that the steel wire is in a loop form, wherein each of the plural adjusting mechanisms comprises an adjusting element, a first sleeve and a second sleeve, wherein the head portion of the steel wire comprises a first movable ball and a first fixed ball, and the tail portion of the steel wire comprises a second movable ball and a second fixed ball, wherein the first movable ball and the first fixed ball are sequentially introduced into a first accommodation space of the first sleeve through a first opening of the first sleeve, and the second movable ball and the second fixed ball are sequentially introduced into the second accommodation space of the second sleeve through the second opening of the second sleeve, wherein a first portion of the steel wire at a first side of the first positioning ball is wound around a first side of the driving wheel in a clockwise direction with respect to a center line of the driving wheel, and a second portion of the steel wire at a second side of the first positioning ball is wound around a second side of the driving wheel in a counterclockwise direction with respect to the center line of the driving wheel, so that the steel wire has a tension for achieving a reciprocating motion while the steel wire is rotated forwardly or backwardly;

plural guide rods, wherein each guide rod is connected with two corresponding slide blocks; and a printhead module connected with the plural guide rods, wherein when at least one of the plural slide rails is rotated in response to a driving force, the corresponding driving wheel is rotated with the slide rail and the corresponding steel wire is moved, wherein as the corresponding slide block is moved with the steel wire, a corresponding guide rod is moved and the printhead module is moved to a desired position in response to the driving force, wherein when each of the plural slide rails is rotated, a displacement dX of the corresponding slide block is expresses as: $dX=\theta\times(D+d)/2$, wherein $\theta$ is a rotation angle of the driving wheel of the corresponding wheel set, D is an outer diameter of the driving wheel of the corresponding wheel set, and d is a diameter of the corresponding steel wire.

2. The steel wire transmission system according to claim 1, wherein each of the plural adjusting mechanisms comprises:

the adjusting element comprising an operating part, a first coupling part and a second coupling part, wherein the first coupling part is located at a first side of the adjusting element, and an outer surface of the first coupling part has a right-spirally outer threaded structure, wherein the second coupling part is located at a second side of the adjusting element, and an outer surface of the second coupling part has a left-spirally outer threaded structure;

the first sleeve located beside the first side of the adjusting element, and comprising the first opening and the first accommodation space, wherein an inner surface of the first sleeve has a right-spirally inner threaded structure, and the right-spirally inner threaded structure of the first sleeve and the right-spirally outer threaded structure of the first coupling part are engaged with each other; and the second sleeve located beside the second side of the adjusting element, and comprising the second opening and the second accommodation space, wherein an inner surface of the second sleeve has a left-spirally inner threaded structure, and the left-spirally inner threaded structure of the second sleeve and the left-spirally outer threaded structure of the second coupling part are engaged with each other.

3. The steel wire transmission system according to claim 2, wherein the first sleeve further comprises a first fixing part, and the second sleeve further comprises a second fixing part, wherein the adjusting mechanism further comprises a first stopping structure and a second stopping structure, and the first stopping structure and the second stopping structure are respectively engaged with the first fixing part and the second fixing part so as to stop the operating part of the adjusting element.

4. The steel wire transmission system according to claim 1, wherein the clamping part of the slide block further comprises an elongated slot, wherein the clamping part is fixed on the slide block through the elongated slot.

5. A steel wire transmission system for a three-dimensional printer, the steel wire transmission system comprising:

n slide rail seats;

n slide rails disposed on corresponding slide rail seats so as to implement multi-axis transmission;

n wheel sets corresponding to the n slide rails, wherein each wheel set comprises a driving wheel and a driven wheel corresponding to the driving wheel, wherein the driving wheel and the driven wheel of each wheel set are fixed at two ends of a corresponding slide rail;

n slide blocks, wherein each slide block is sheathed around the corresponding slide rail and movable between a corresponding driving wheel and a corresponding driven wheel, wherein each slide block has a clamping part, wherein the clamping part comprises a receiving structure, two first hooking structures and two second hooking structures, wherein the first hooking structures are located at two opposite sides of the receiving structure, and the second hooking structures are located at the two opposites sides of the receiving structure, wherein the two first hooking structures and the two second hooking structures are open to opposite directions;

n steel wires wound around the plural wheel sets and penetrated through corresponding slide blocks, wherein the driving wheel has a perforation, and a corresponding steel wire has a first positioning ball, wherein the first positioning ball is formed on the steel wire and accommodated within the perforation of the driving wheel, wherein each steel wire further comprises a second positioning ball, wherein the second positioning ball is formed on the steel wire and accommodated within the receiving structure of the clamping part of the slide block, wherein the steel wire is penetrated through the two first hooking structures and the two second hooking structures;

n adjusting mechanisms corresponding to the steel wires, wherein each adjusting mechanism is connected with the corresponding steel wire and in parallel with the corresponding slide rail, wherein a head portion and a tail portion of each steel wire are disposed within a corresponding adjusting mechanism, so that the steel wire is in a loop form, wherein each of the adjusting mechanisms comprises an adjusting element, a first sleeve and a second sleeve, wherein the head portion of the steel wire comprises a first movable ball and a first fixed ball, and the tail portion of the steel wire comprises a second movable ball and a second fixed ball, wherein the first movable ball and the first fixed ball are sequentially introduced into a first accommodation space of the first sleeve through a first opening of the first sleeve, and the second movable ball and the second fixed ball are sequentially introduced into the second accommodation space of the second sleeve through the second opening of the second sleeve, wherein a first portion of the steel wire at a first side of the first positioning ball is wound around a first side of the driving wheel in a clockwise direction with respect to a center line of the driving wheel, and a second portion of the steel wire at a second side of the first positioning ball is wound around a second side of the driving wheel in a counterclockwise direction with respect to the center line of the driving wheel, so that the steel wire has a tension for achieving a reciprocating motion while the steel wire is rotated forwardly or backwardly;

m guide rods, wherein each guide rod is connected with two corresponding slide blocks; and a printhead module connected with the m guide rods, wherein n=2m, and m is a positive integer, wherein when at least one of the plural slide rails is rotated in response to a driving force, the corresponding driving wheel is rotated with the slide rail and the corresponding steel wire is moved, wherein as the corresponding slide block is moved with the steel wire, a corresponding guide rod is moved and the printhead module is moved to a desired position in response to the driving force, wherein when each of the plural slide rails is rotated, a displacement dX of the corresponding slide block is expressed as: $dX=\theta \times (D+d)/2$, wherein $\theta$ is a rotation angle of the driving wheel of the corresponding wheel set, D is an outer diameter of the driving wheel of the corresponding wheel set, and d is a diameter of the corresponding steel wire.

6. The steel wire transmission system according to claim 5, wherein the clamping part of the slide block further comprises an elongated slot, wherein the clamping part is fixed on the slide block through the elongated slot.

* * * * *